United States Patent
Peng et al.

(10) Patent No.: US 11,354,223 B2
(45) Date of Patent: Jun. 7, 2022

(54) MAXIMALLY PARALLEL TEST SCRIPT EXECUTION

(71) Applicant: MICRO FOCUS LLC, Santa Clara, CA (US)

(72) Inventors: Jun-Chen Peng, Shanghai (CN); Xiang Gao, Shanghai (CN); Kai Long, Shanghai (CN); Ruixiang Chen, Shanghai (CN); Lingli Wu, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 108 days.

(21) Appl. No.: 16/808,882

(22) Filed: Mar. 4, 2020

(65) Prior Publication Data
US 2021/0279166 A1 Sep. 9, 2021

(51) Int. Cl.
*G06F 11/36* (2006.01)
*G06F 9/30* (2018.01)
*G06F 9/38* (2018.01)

(52) U.S. Cl.
CPC ........ *G06F 11/3676* (2013.01); *G06F 9/3005* (2013.01); *G06F 9/3842* (2013.01); *G06F 11/3684* (2013.01); *G06F 11/3692* (2013.01)

(58) Field of Classification Search
CPC ............. G06F 11/3664; G06F 11/3684; G06F 11/3688; G06F 11/3692; G06F 11/3672; G06F 11/3676; G06F 8/314; G06F 8/445; G06F 8/45
See application file for complete search history.

(56) References Cited

U.S. PATENT DOCUMENTS

| | | | |
|---|---|---|---|
| 9,477,583 B2 | 10/2016 | Maddela | |
| 2011/0145643 A1* | 6/2011 | Kumar | G06F 11/263 714/33 |
| 2012/0297389 A1* | 11/2012 | Haham | G06F 8/451 718/102 |
| 2015/0100829 A1 | 4/2015 | Nanjundappa et al. | |
| 2018/0137035 A1* | 5/2018 | Magre | G06F 11/3692 |
| 2018/0173606 A1 | 6/2018 | Malla et al. | |
| 2019/0196950 A1 | 6/2019 | Ranganathan et al. | |

OTHER PUBLICATIONS

Kinsbruner, "How to Scale (Up) your Test Automation Practices and Achieve Better APP Quality", Mobile Technical Evangelist at Perfecto, Jan. 18, 2018.
"Accelerated Test Automation for Web and Mobile, Smarter Test Execution Awaits", 2019, https://www.perfecto.io/products/platform/smart-test-execution, 7 pp.
"UFT Mobile—Appium (Open Source) Extension", Microfocus Inc., 2019 https://www.microfocus.com/media/flyer/uft-mobile-appium-open-source-extension-flyer.pdf.

* cited by examiner

*Primary Examiner* — Duy Khuong T Nguyen

(57) ABSTRACT

A test script is divided into tests having a sequential order within the test script. An analysis tree of the tests can be generated. Each unique path through the analysis tree includes a subset of the tests as sequentially ordered within the test script. A maximally parallel subset of the unique paths that covers all the tests and according to which the tests are successfully executable is identified. Each test appears in only one unique path of the maximally parallel subset.

20 Claims, 16 Drawing Sheets

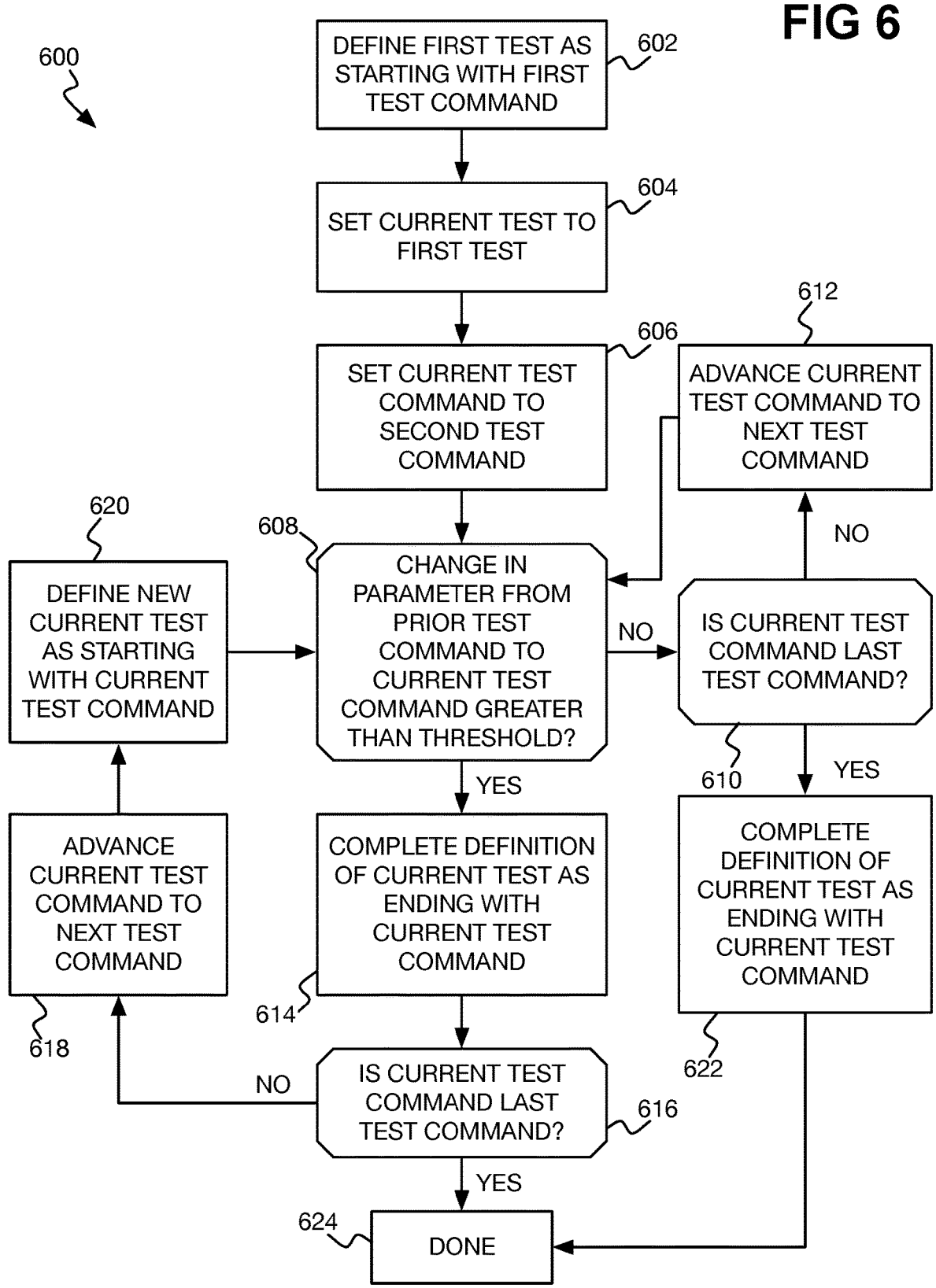

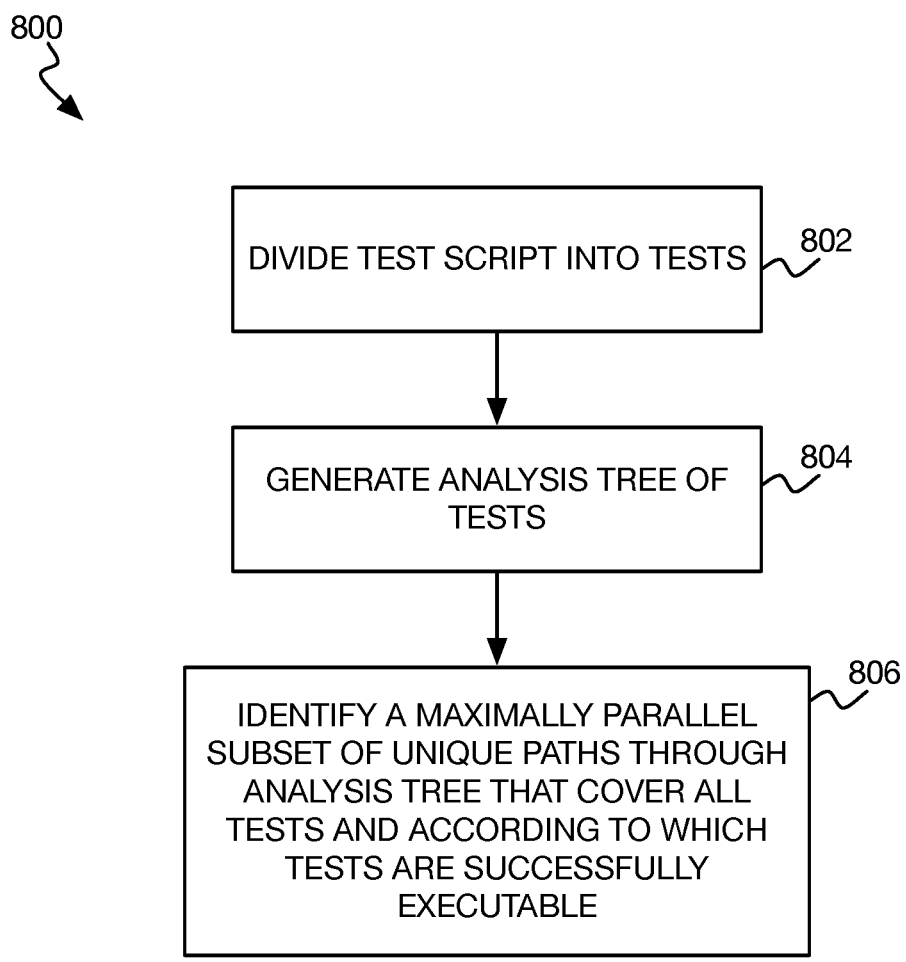

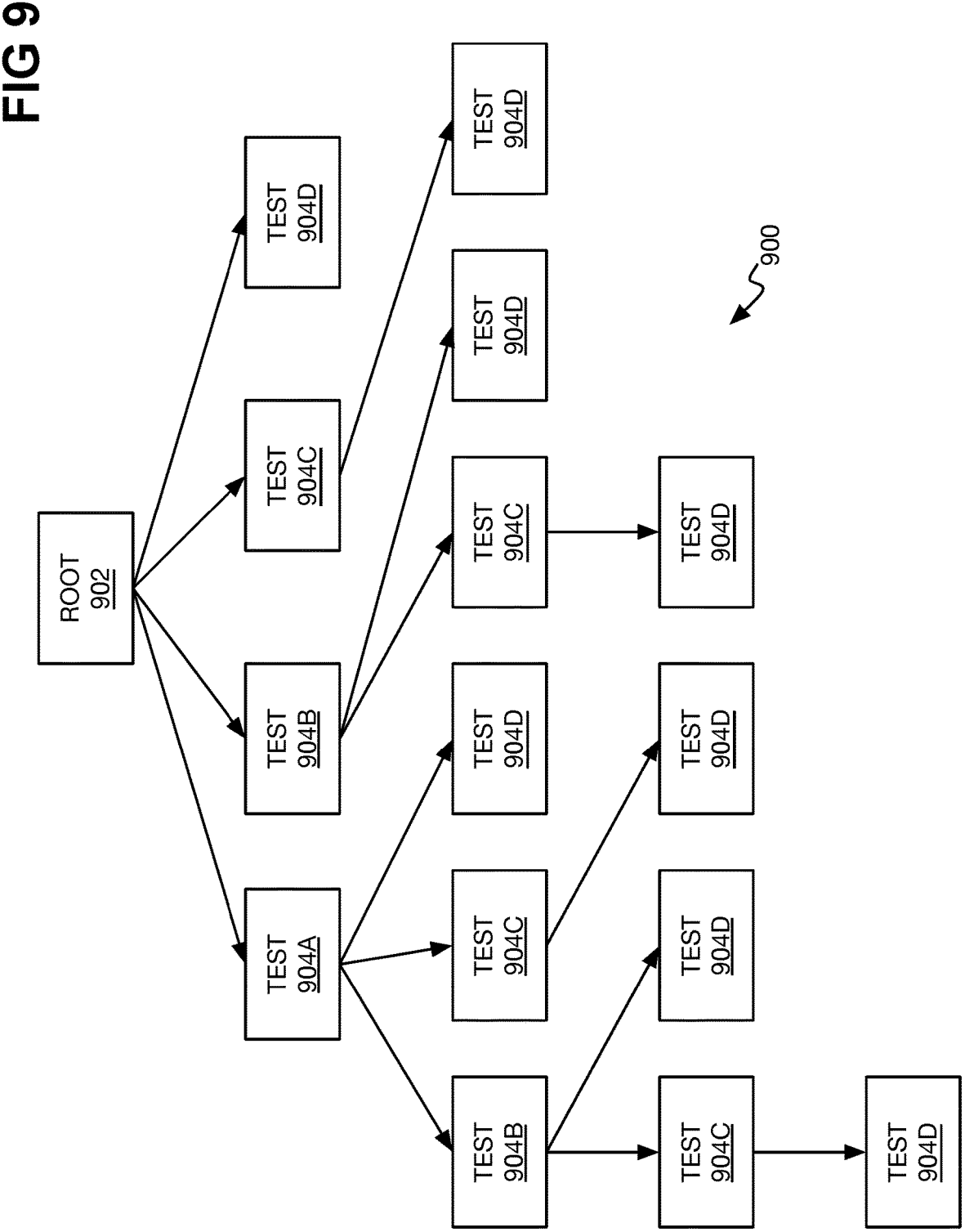

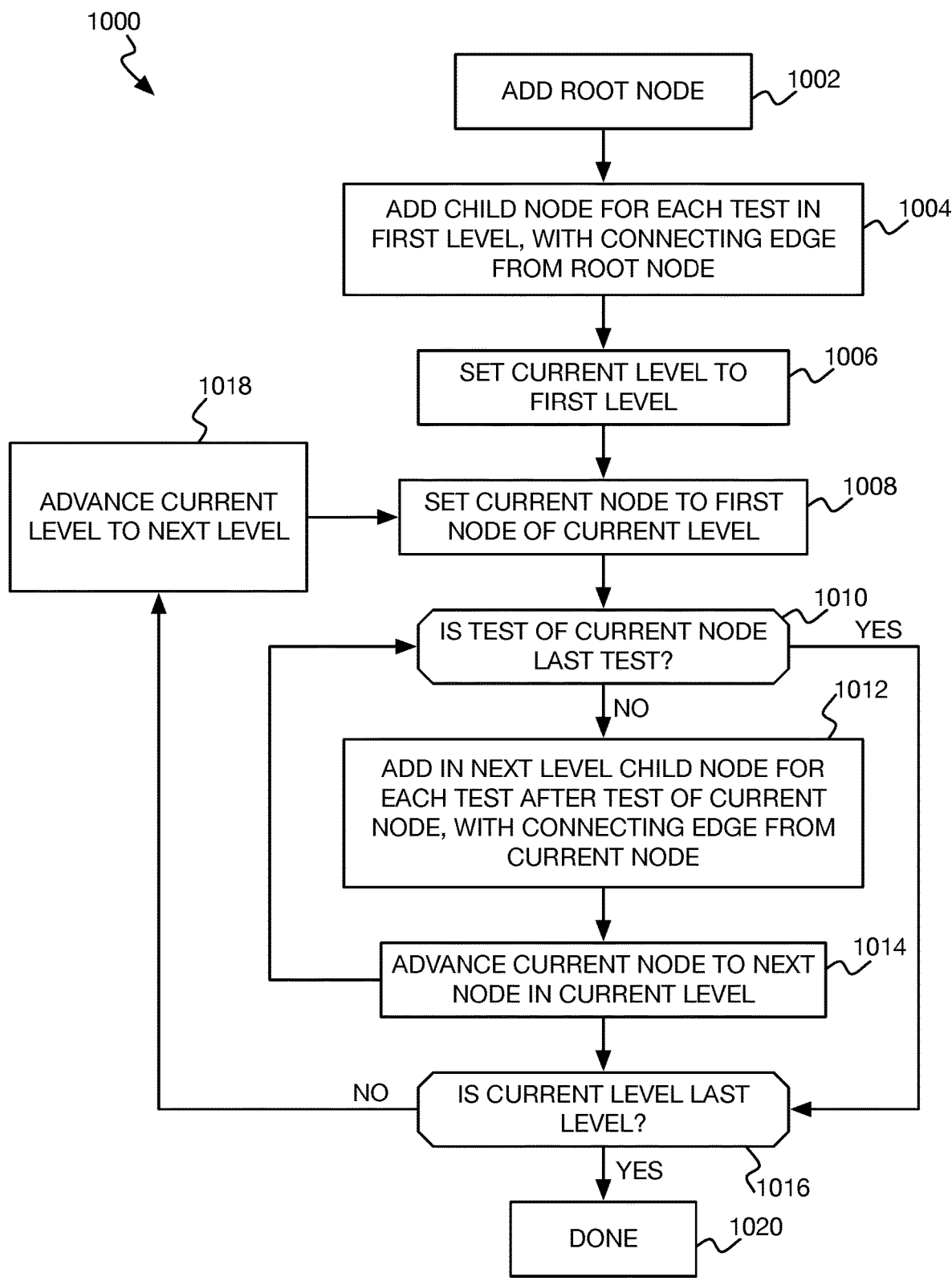

MAXIMALLY PARALLEL TEST SCRIPT EXECUTION

BACKGROUND

Computing devices like desktop, laptop, and other types of computers, as well as mobile computing devices like smartphones, among other types of computing devices, run software, which can be referred to as applications, to perform intended functionality. An application may be a so-called native application that runs on a computing device directly, or may be a web application or "app" at least partially run on remote a computing device accessible over a network, such as via a web browser running on a local computing device. To ensure that an application has been developed correctly to perform its intended functionality and that the application is operating correctly, the application may be tested.

BRIEF DESCRIPTION OF THE DRAWINGS

FIG. 6 is a flowchart of an example method for dividing test commands of a test script into tests, and which can be performed as a part of the processing of FIG. 2.

FIG. 8 is a flowchart of an example method for identifying a maximally parallel subset of unique paths of tests into which a test script has been divided and that can be successfully executed in parallel.

FIG. 9 is a diagram of an example analysis tree of tests into which a test script has been divided and that has unique paths including subsets of the tests as sequentially ordered within the test script.

FIG. 10 is a flowchart of an example method for generating an analysis tree of tests into which a test script has been divided and that has unique paths including subsets of the tests as sequentially ordered within the test script.

DETAILED DESCRIPTION

Figure 1:
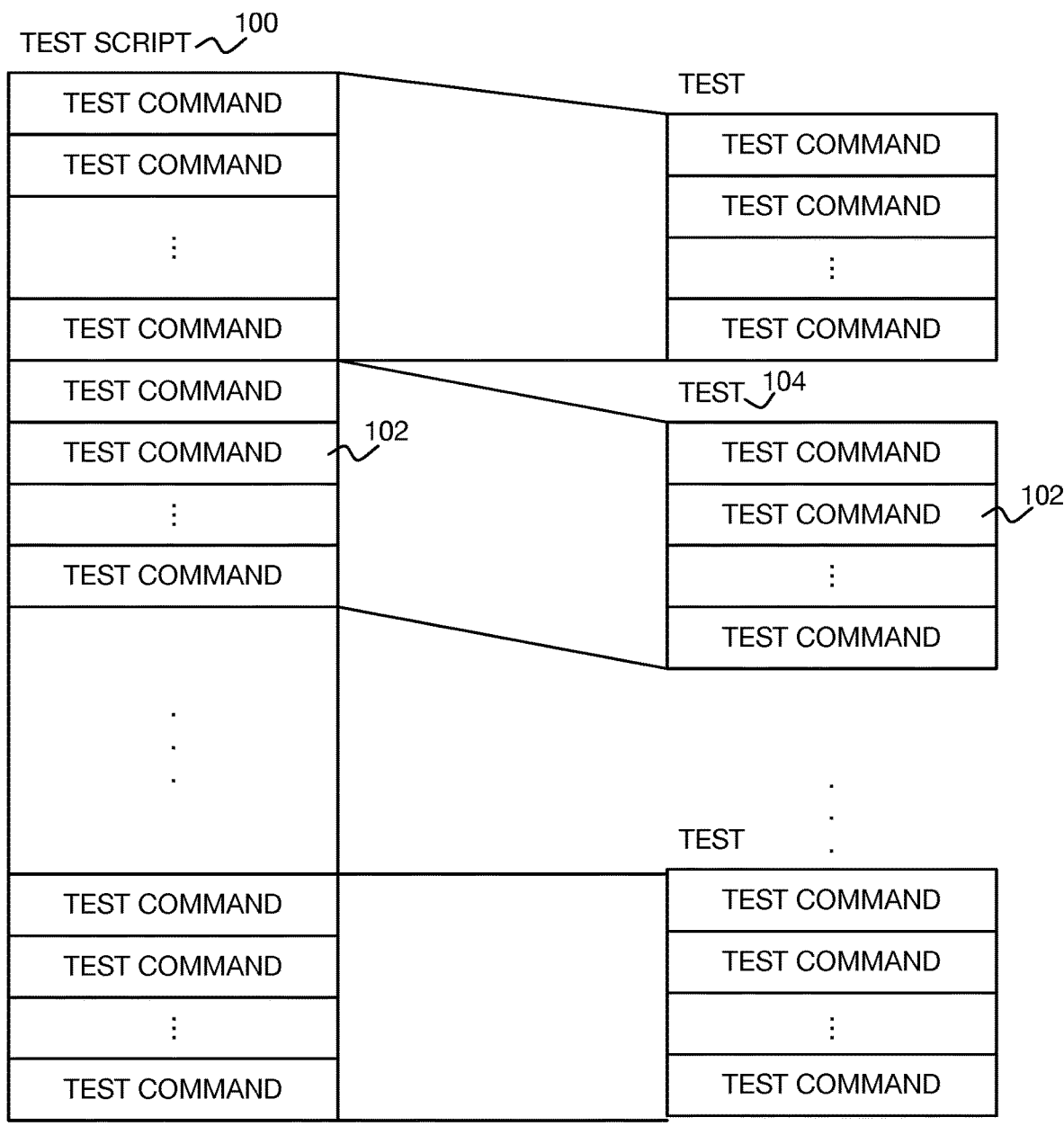
FIG. 1 is a diagram of an example test script having test commands divided into tests.

As noted in the background, an application is a computer program that is run, or executed, to perform intended functionality, and which may be tested to ensure that the application performs its intended functionality correctly. An application being tested may be referred to as an application under test (AUT). An AUT may expose a user interface that includes user interface objects, such as check boxes, buttons, text boxes, and other types of objects. During testing, the user interface objects may be selected in a defined sequence of test commands of a test script to verify that the application operates as expected.

While the test commands of a test script are sequentially ordered within the test script, groups of test commands, referred to herein as tests of the test script, may be able to be executed in parallel during playback of the test script to test the AUT. The tests may be assigned to different testing devices of the same or different types. Parallel test execution permits AUT testing to occur more quickly and thus more efficiently. Testing efficiency is particularly beneficial during load testing of the AUT, to assess whether the AUT is likely to have satisfactory performance when a large number of end users are using the AUT at the same time.

However, dividing the test commands of a test script into tests that can be successfully performed in parallel is a difficult process. A tester may have to manually divide the test commands of a test script into tests in a seemingly arbitrary manner, and then attempt parallel execution of the tests. If a test cannot be successfully performed in parallel with another test, this means that its execution is conditioned on the prior execution of the latter test and has to be merged back together with the prior test. The tester may thus have to painstakingly perform multiple iterations of dividing test commands into tests and attempt their parallel execution to identify tests that can be successfully executed in parallel.

Techniques described herein ameliorate these and other difficulties. To preliminarily divide the test commands of a test script into tests, the test commands can first be sequentially executed. A parameter, such as a user interface parameter, can be monitored as the test commands are executed. The test commands can be preliminarily divided into tests in correspondence with changes in the parameter between consecutive test commands greater than a threshold. That is, the parameter changing by more than the threshold after execution of a test command signifies the start of a new test.

Once the test commands have been divided into tests, an analysis tree of the tests can be generated to identify the tests that can actually be successfully performed in parallel. The unique paths through the analysis tree correspond to all the different ways in which the tests can be grouped for parallel execution, with each unique path including a subset of the tests as in the test script. A maximally parallel subset of the unique paths that covers all the tests and that can be successfully executed is identified. That is, while the tests of a unique path are performed in sequential order, the maximally parallel subset's unique paths themselves are run in parallel. The tests of a unique path are thus in effect merged back together for execution.

Once the maximally parallel subset of the unique paths has been identified, each unique path of tests may be assigned to testing devices for subsequent execution. The testing devices may be of different types, and different tests may not be able to be executed on certain types of testing devices. Execution of the tests of each unique path is attempted on testing devices of each type. If any test of a unique path fails execution on testing devices of a given type, then the unique path is not subsequently assigned to such testing devices for execution.

The techniques described herein can therefore identify the most efficient manner in which the test commands of a test script can be grouped for parallel execution. The division of the test commands over tests provides a preliminary and thus best case of such parallel execution, if the identified tests can be successfully performed in parallel. However, generating an analysis tree of the tests and identifying the maximally parallel subset of unique paths through the tree that covers all the tests and that can be successfully executed, effectively merges the tests back together in correspondence with the largest number of groups of test commands that can be successfully run in parallel.

FIG. 1 shows an example test script 100. The test script 100 may be for an AUT. The test script 100 includes sequentially ordered test commands 102. The test commands 102 may each correspond to the selection or actuation of a user interface object of the AUT. The test script 100 may be manually recorded by a tester actuating the user interface objects of the AUT in a desired sequence, for instance. Subsequent playback of the test script 100 in an automated scaled-up manner on multiple testing devices, by the devices executing or running the test commands 102, effectuates load testing in particular of the AUT.

In the example of FIG. 1, the test commands 102 of the test script 100 have been preliminarily divided into tests 104. The tests 104 are groups of the test commands 102. The tests 104 are sequentially ordered within the test script 100 in correspondence with the test commands 102 that the tests 104 encompass. Each test 104 encompasses a different sequentially contiguous subset of the test commands 102. Each test command 102 is encompassed by just one test 104, such that the tests 104 do not overlap one another.

The tests 104 into which the test commands 102 have been organized can represent a preliminary grouping of the test commands 102 into a best case set of groups, or tests 104, that can be executed in parallel. However, in actuality some of the tests 104 may not be able to be executed in parallel with the other tests 104. Therefore, the tests 104 may in effect have to be selectively merged back together until they can be successfully performed in parallel.

Figure 2:
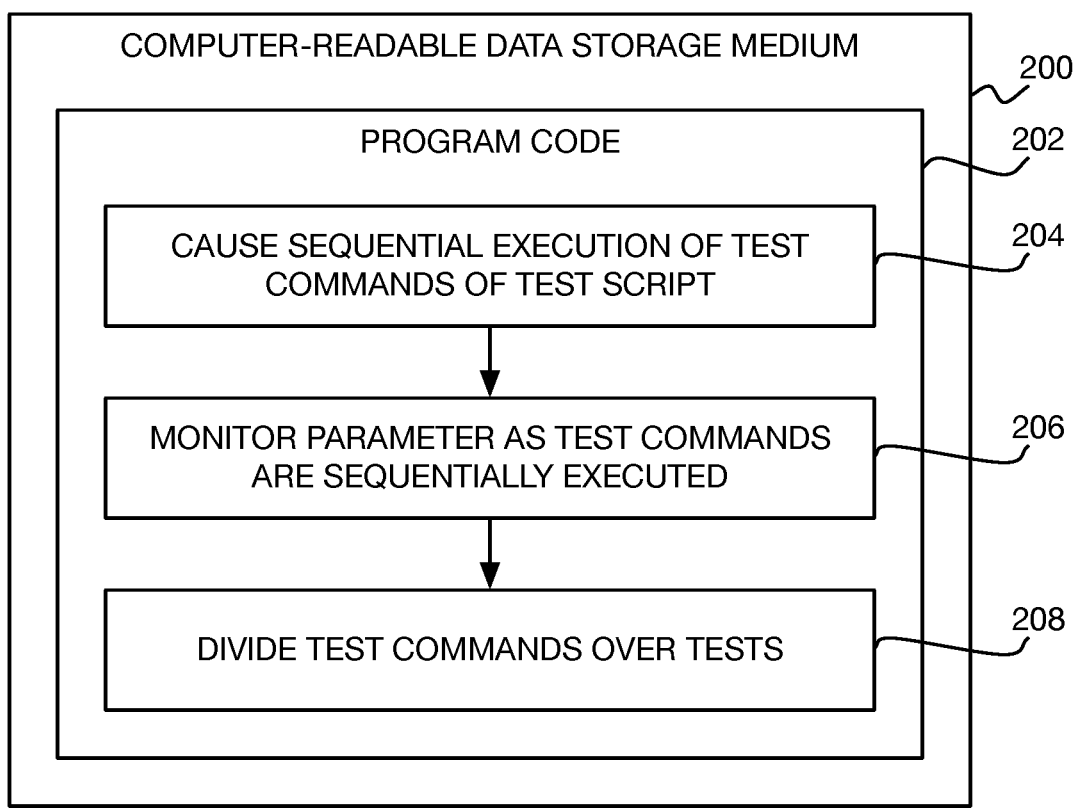
FIG. 2 is a diagram of an example computer-readable data storage medium storing program code for dividing test commands of a test script into tests.

FIG. 2 shows an example non-transitory computer-readable data storage medium 200. The computer-readable data storage medium 200 stores program code 202 executable by a processor, such as that of a computing device like a desktop or laptop computer, a server, or another type of a computing device. The program code 202 is executable by the processor to perform processing for preliminarily dividing the test commands 102 of the test script 100 for an AUT into tests 104.

The processing includes causing sequential execution of the test commands 102 of the test script 100 (204), as ordered in the test script 100. The processing includes, as the test commands 102 are sequentially executed, monitoring a parameter (206). The parameter may be a user interface parameter or another parameter, which may change with the execution of each test command 102 of the test script 100. Examples of such a user interface parameter in particular are described later in the detailed description.

The processing includes dividing the test commands 102 over tests 104 of the test script 100 (208), such as in correspondence with changes in the parameter greater than a threshold. The changing of the parameter by more than the threshold at execution of a test command 102, for instance, can signify a new test 104 beginning with the test command 102 in question. The division of the test commands 102 into tests 104 may be a preliminary such division, with the tests 104 in effect selectively merged back together depending on whether they can be successfully performed in parallel.

Figure 3A:
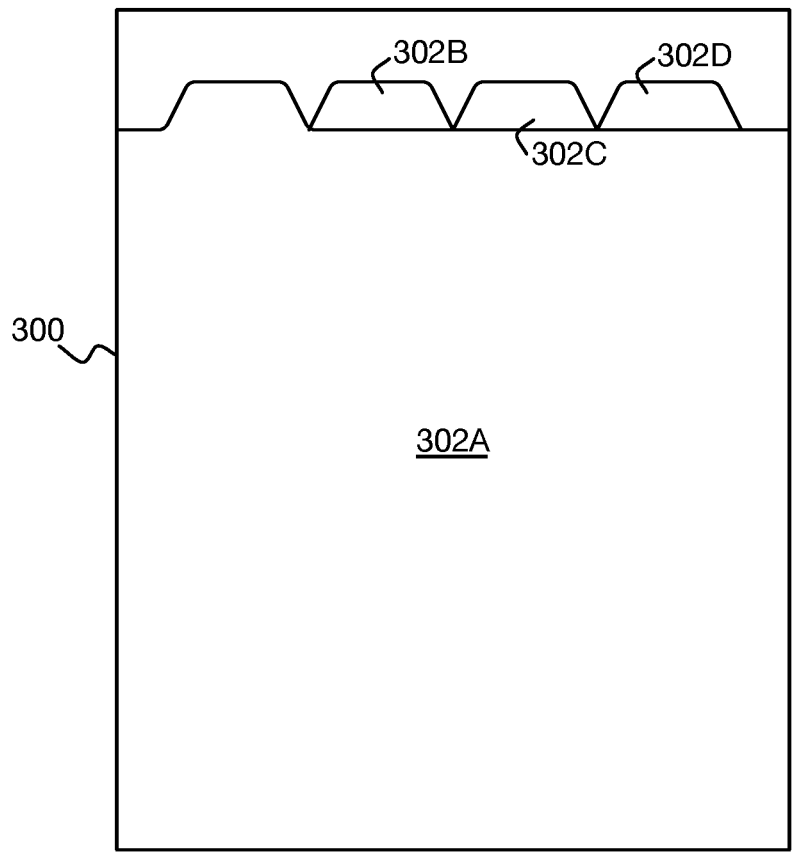
FIGS. 3A and 3B are diagrams depicting an example of how execution of a test command of a test script can signify the start of a new test, with respect to a user interface of an application under test (AUT).
Figure 3B:
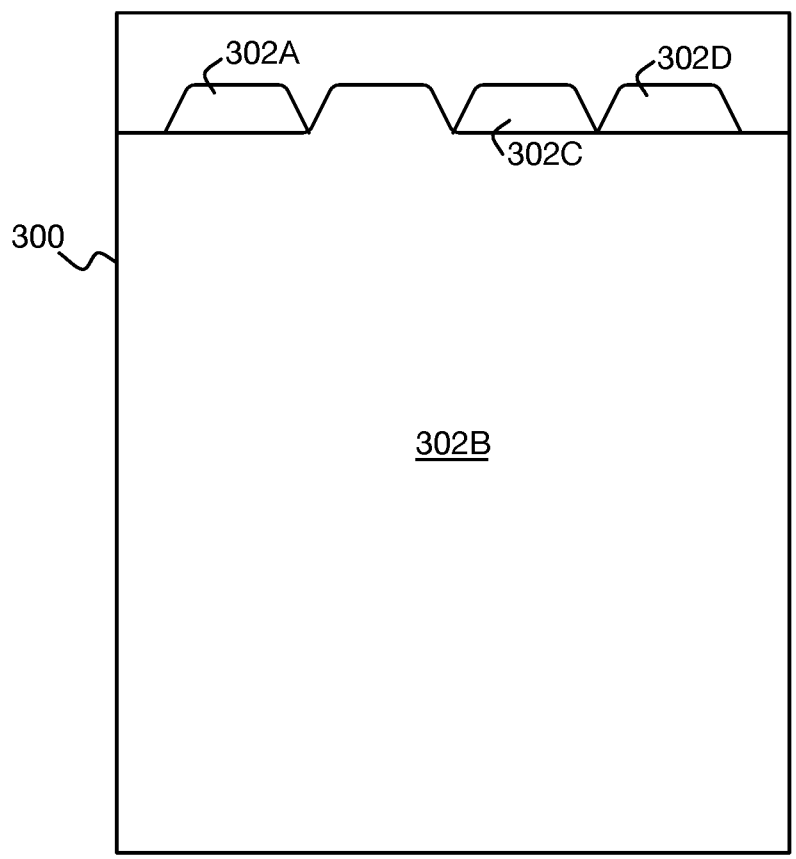

FIGS. 3A and 3B show an example as to how a change in a user interface parameter can signify the start of a new test 104. FIGS. 3A and 3B specifically show a user interface 300 exposed by an AUT. The user interface 300 includes different selectable tabs 302A, 302B, 302C, and 302D, which are collectively referred to as the tabs 302. The tabs 302 are examples of user interface objects of the AUT.

In FIG. 3A, a first test command 102 is executed in the context of the tab 302A. That is, the tab 302A is the user interface object that is the subject of execution of this first test command 102. By comparison, in FIG. 3B, a consecutive, second test command 102 is executed in the context of the tab 302B. That is, the tab 302B is the user interface object that is the subject of execution of the second test command 102. For instance, the second test command 102 may correspond to initial selection of the tab 302B, in relation to which subsequent test commands 102 may be executed.

The user interface parameter in the example of FIGS. 3A and 3B is the user interface object that is the subject of execution of the test commands 102 of the test script 100. The user interface parameter has changed from execution of the first test command 102 of FIG. 3A to execution of the second test command 102 of FIG. 36, because the test commands 102 pertain to different user interface objects: the tab 302A in FIG. 3A and the tab 3026 in FIG. 3B. Insofar as the user interface object has changed, it is said that the user interface parameter has changed by more than the threshold, which is a qualitative as opposed to a quantitative threshold in this respect.

Therefore, the second test command 102 signifies the start of a new test 104, beginning with the second test command 102. The first test command 102 is the last test command 102 of the prior test 104. The border between these two adjacent tests 104 thus corresponds to a change in a user interface parameter—a user interface object—from execution of the first test command 102 in FIG. 3A to execution of the second test command 102 in FIG. 3B. FIGS. 3A and 38 therefore show how monitoring the user interface object that is the subject of test commands 102 can be used to divide the test commands 102 into tests 104 of the test script 100.

Figure 4:
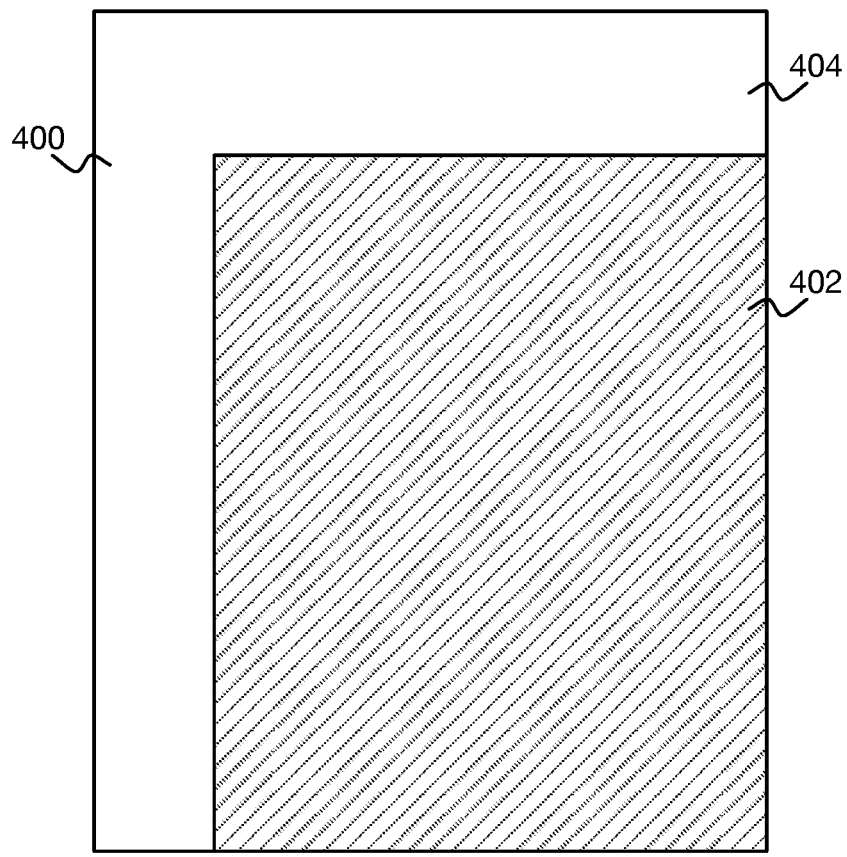
FIG. 4 is a diagram depicting another example of how execution of a test command of a test script can signify the start of a new test, with respect to a user interface of an AUT.

FIG. 4 shows another example as to how a change in a user interface parameter can signify the start of a new test 104. FIG. 4 shows a screenshot of a user interface 400 exposed by an AUT. Execution of a test command 102 has resulted in a changed portion 402 of the user interface 400 relative to the prior test command 102, as well as an unchanged portion 402. The changed portion 402 is more than a threshold percentage of the user interface 400 as a whole.

Therefore, the execution of the test command 102 that resulted in this change of the user interface 400 by more than the threshold percentage signifies the start of a new test 104, beginning with the test command 102 in question. The user interface parameter in the example of FIG. 4 is the screenshot of the user interface 400. FIG. 4 thus shows how monitoring the screenshot of the user interface 400 as to how much of the user interface 400 changes as a result of execution of test commands 102 can be used to divide the test commands 102 into tests 104 of the test script 100.

Figure 5A:
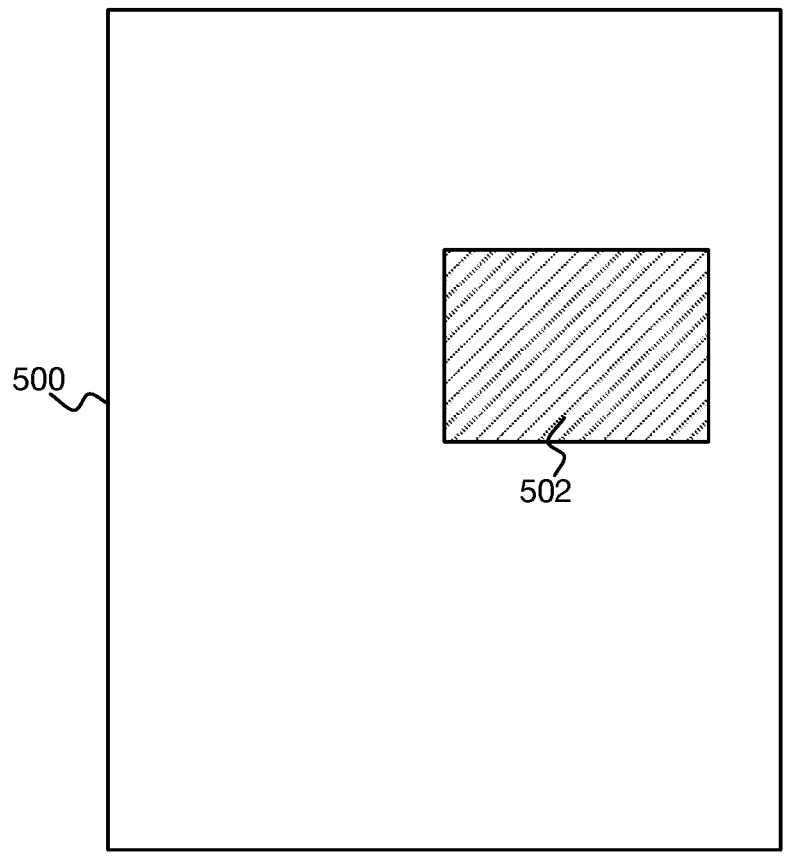
FIGS. 5A and 5B are diagrams depicting still another example of how execution of a test command of a test script can signify the start of a new test, with respect to a user interface of an AUT.
Figure 5B:
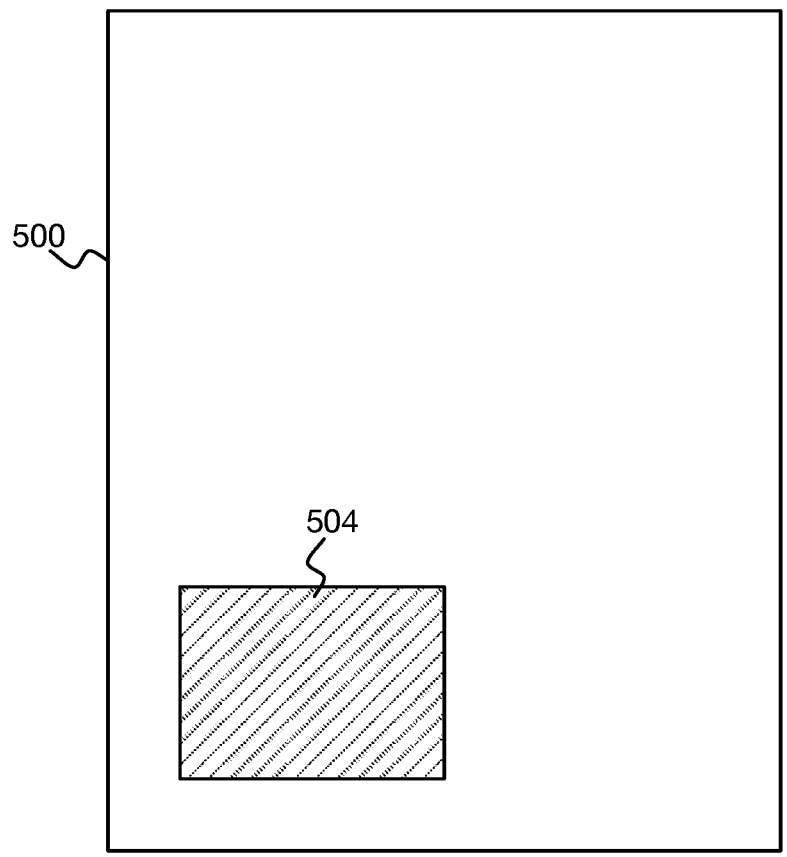

FIGS. 5A and 5B show a third example as to how a change in a user interface parameter can signify the start of a new test 104. FIGS. 5A and 5B show a user interface 500 exposed by an AUT. In FIG. 5A, execution of a first test command 102 results in a change in the user interface 500 within a portion 502. In FIG. 5B, execution of a consecutive, second test command 102 results in a change in the user interface 500 within a different portion 504. The execution of the second test command 102 that resulted in a change in the user interface 500 within the different portion 504 as compared to execution of the immediately prior first test command 102 signifies the start of a new test 104, beginning with the second test command 104.

The user interface parameter in the example of FIGS. 5A and 5B is the portion within the screenshot, such as of the user interface 500, which changed during test command execution. Insofar as the portion 504 within the screenshot that changed in FIG. 5B is different than the portion 502 in FIG. 5A, it is said that the user interface parameter has changed by more than the threshold. FIGS. 5A and 5B thus show how monitoring which portion of the screenshot of the user interface 500 changes as a result of execution of test commands 102 can be used to divide the test commands 102 into tests 104 of the test script 100.

FIG. 6 shows an example method 600 for dividing the test commands 102 of the test script 100 over tests 104. The method 600 can be performed to implement part 208 of FIG. 2, after monitoring of a parameter as the test commands 102 have been sequentially performed. The method 600 can be implemented as program code stored on a non-transitory computer-readable data storage medium and executable by a processor of a computing device.

The method 600 defines a first test 104 as starting with the first test command 102 of the test script 100 (602). A current test 104 is set to the first test 104 (604), and a current test command 102 is set to the second test command 102 (606). If the change in the parameter from the prior test command 102 to the current test command 102 is not greater than a threshold (608), and if the current test command 102 is not the last test command 102 of the test script 100 (610), the method 600 advances the current test command 102 to the next test command 102 within the test script 100 (612). The method 600 is then repeated at part 608.

However, if the change in the parameter from the prior test command 102 to the current test command 102 is greater than the threshold (608), then the definition of the current test 104 is completed as ending with the current test command 102 (614). If the current test command 102 is not the last test command 102 of the test script 100 (616), the current test command 102 is advanced to the next test command 102 within the test script 100 (618), and a new current test 104 is defined as starting with the current test command 102 (620). The method 600 is then repeated at part 608.

If the change in the parameter from the prior test command 102 to the current test command 102 is not greater than the threshold (608), and the current test command 102 is the last test command 102 of the test script 100 (610), the definition of the current test 104 is completed as ending with the current test command 102 (622). The method 600 is then finished (624). Similarly, if the change in the parameter from the prior test command 102 to the current test command 102 is greater than the threshold (608), resulting in completion of the definition of the current test 104 with the current test command (614), and the current test command 102 is the last test command 102 (616), the method 600 is finished (624).

The method 600 thus defines the first test 104 of the test script 100 starting with the first test command 102 of the script 100, and ends the first test 104 at the test command 102 prior to the test command 102 at which the parameter changes by more than the threshold, or at the last test command 102. If there are more test commands 102 when the first test 104 has its definition completed, then the method 600 starts a new test 104 with the test command 102 at which the parameter changes by more than the threshold. This process is repeated until the method 600 reaches the last test command 102 of the test script 100. The current test command 102 being the last test command 102 of the script 100 can thus be considered the exit condition that is set or satisfied to exit this repeating process.

Each test 104 of the test script 100 spans a contiguous subset of the test commands 102 within the test script 100, with adjacent tests 104 separated at borders between adjacent test commands 102 between which the parameter changes by more than the threshold. The tests 104 are sequentially ordered over the test commands 102 of the test script 100. The first test 104 starts at the first test command 102 of the test script 100, and every other test 104 starts at a test command 102 of the test script 100 at which the change in the parameter from the prior test command 102 is greater than the threshold.

Figure 7A:
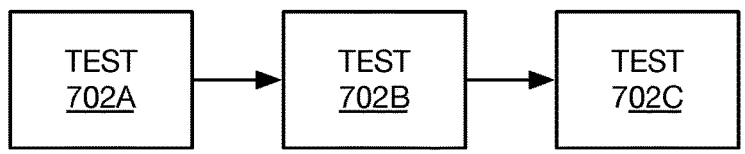
FIGS. 7A, 7B, 7C and 7D are diagrams of examples as to how three tests into which a test script has been divided can be executed in different parallel and serial combinations.
Figure 7B:
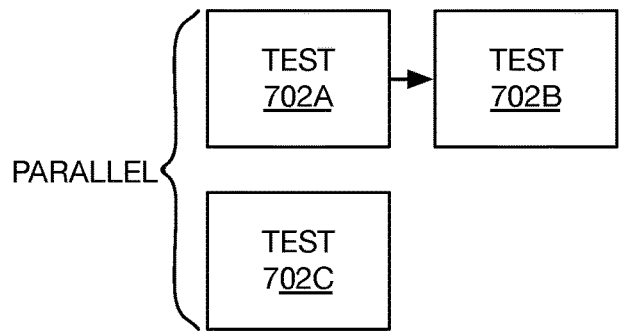
Figure 7C:
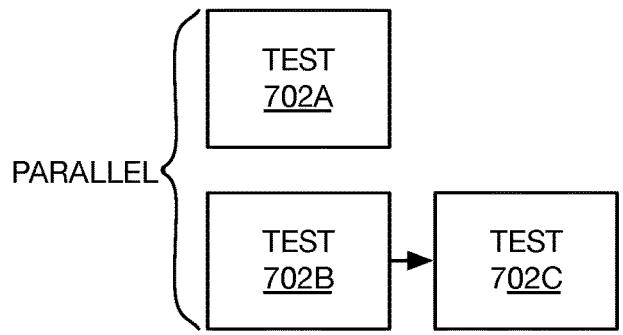

FIGS. 7A, 7B, and 7C show examples of how three tests 702A, 702B, and 702C over which the test commands of a test script may have been preliminarily divided can be executed in different parallel and serial combinations. The tests 702A, 702B, and 702C are collectively referred to as the tests 702. In FIG. 7A, there is one unique path made up of tests 702A, 702B, and 702C ordered in the sequence in which their test commands are executed within the test script. The unique path of FIG. 7A is the absolute minimally parallel unique path (i.e., the absolute maximally serial unique path) that encompasses all tests 702, because none of the tests 702 are executed in parallel. In FIG. 7A, the tests 702 can be considered to have in effect been merged back together, since all are performed in sequence within one unique path and none are performed in parallel.

In FIG. 7b, there are two unique paths: a unique path encompassing tests 702A and 702B, in which the test 702A is executed before the test 702B, and a unique path encompassing just test 702C. The two unique paths are executed in parallel to one another, and together encompass all tests 702. In FIG. 7B, the tests 702A and 702B can be considered to have in effect been merged back together, since the test 702B is performed in sequence after the test 702A in the same chain, and the chain of tests 702A and 702B is performed in parallel with the test 702C.

Similarly, in FIG. 7C, there are two unique paths: a unique path encompassing just test 702A, and a unique path encompassing tests 702B and 702C, in which the test 702B is executed before the test 702C. The two unique paths are executed in parallel to one another, and together encompass all tests 702. In FIG. 7C, the tests 702B and 702C can be considered to have in effect been merged back together, since the test 702C is performed in sequence after the test 702B in the same chain, and the chain of tests 702B and 702C is performed in parallel with the test 702A.

Figure 7D:
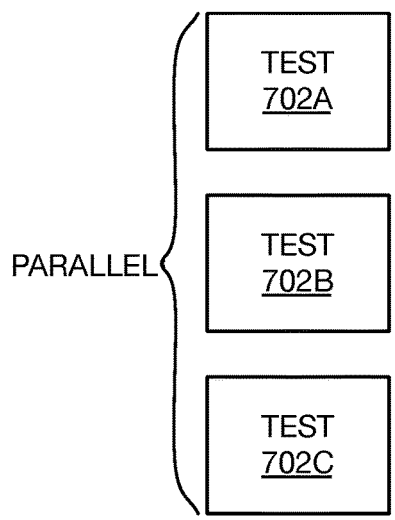

In FIG. 7D, there are three unique paths respectively encompassing the tests 702A, 702B, and 702C, and this set of unique paths encompasses all tests 702. The set of unique paths of FIG. 7D is the absolute maximally parallel set of unique paths that encompasses all tests 702, because all tests 702 are executed in parallel. This set can also be referred to as the absolute minimally serial set of unique paths.

FIGS. 7A, 7B, 7C, and 7D thus show various ways in which the tests 702 can be organized over unique paths that are executed in parallel with one another, where the tests of any given path are sequentially executed as per their order within the test script, in the case in which the test script has been preliminarily divided over three tests 702. However, the tests 702 may not be successfully executable pursuant to every figure. For example, of the tests 702B and 702C that have been preliminarily identified, performing the test 702C in parallel with the test 702B may not be successful. Rather, the test 702C may have to have its execution conditioned on the prior execution of the test 702B.

In this example, this means that the unique paths into which the tests 702 have been organized in FIGS. 76 and 7D cannot be successfully executed, because the test 702C is executed in parallel with the test 702B in these figures. That is, the tests 702B and 702C belong to different unique paths in FIGS. 78 and 7D. The tests 702B and 702C have to in effect be merged back together after having been preliminarily identified, as is the case in FIGS. 7A and 7C.

Continuing with this example, if the test 702B also has its execution conditioned on the prior execution of the test 702A, then the most efficient way to execute the tests 702 is in accordance with FIG. 7A. This is because the tests 702A and 702B have to be executed as part of the same unique path and thus effectively merged back together, and they are not in FIG. 7C. However, if the test 702B can be successfully executed in parallel with the test 702A, then the most efficient way to execute the tests 702 is in accordance with FIG. 7C, because FIG. 7C has more unique paths than FIG. 7A, and the paths of FIG. 7C are each shorter in length than the path of FIG. 7A.

The chains of FIGS. 7A, 7B, 7C, and 7D in which the tests 702 can be executed in various parallel and serial combinations constitute a set of unique chains. Each of FIGS. 7A, 7B, 7C, and 7D specifies a subset of these unique chains that covers all the tests 702, and in which each test 702 appears just once. In the described example, in which the test 702C cannot be successfully executed in parallel with the test 702B but the test 702A can be executed in parallel with both tests 702B and 702C, the subset of unique chains of FIG. 7C is the maximally parallel subset of the unique chains in which the tests 702 can be successfully executed.

FIG. 8 shows an example method 800 for identifying the maximally parallel subset of unique paths of tests into which a test script has been preliminarily divided and that can be successfully executed in parallel. The method 800 can be performed by a processor of a computing device. The method 800 includes (preliminarily) dividing the test script into tests (802), such as has been described in relation to FIG. 2.

The method 800 includes generating an analysis tree of the tests having unique paths through the tree and that each include a subset of the tests as sequentially ordered within the test script (804). An example of such an analysis tree and how the analysis tree can be generated are described later in the detailed description. In the case of a test script that has been divided into three tests, the set of unique paths through the analysis tree corresponds to the set of unique paths that have been described in relation to FIGS. 7A, 7B, 7C, and 7D.

The method 800 includes then identifying the maximally parallel subset of unique paths through the analysis tree that covers all tests and that according to which the tests are successfully executable (806). An example as to how the maximally parallel subset can be identified is described later in the detailed description. As noted above, the absolute maximally parallel subset of the unique paths is that in which each unique path includes just one test, such that all the tests are executed in parallel (since all the paths are executed in parallel). However, the absolute maximally parallel subset is not the maximally parallel subset that can be successfully executed if the execution of any test is conditioned on the execution of another test. Further, each test appears in only one unique path of the identified maximally parallel subset.

FIG. 9 shows an example analysis tree 900 for a test script that has been preliminarily divided over four tests 904A, 904B, 904C, and 904D, which are collectively referred to as the tests 904. In the example of FIG. 9, the first test 904A appears once in the analysis tree 900; the second test 904B appears twice; the third test 904C appears four times; and the fourth test 904D appears eight times. In general, the n-th test 904 appears $2^{(n-1)}$ times in the analysis tree 900 in the example of FIG. 9.

There is an edge from a root node 902 to each test 904 of the test script in a first level of the analysis tree 900. From each test 904 in the first level, there is an edge to every test 904 in a second level of the analysis tree 900 that appears after the test 904 within the test script. For example, from the test 904A in the first level there are edges to tests 904B, 904C, and 904D in the second level, since the tests 904B, 904C, and 904D are sequentially ordered after the test 904A within the test script.

Similarly, from the test 904B in the first level of the analysis tree 900 there are edges to tests 904C and 904D in the second level, since the tests 904D and 904D are sequentially ordered after the test 904B within the test script. There is no edge from the test 904B in the first level to the test 904A in the second level. This is because the test 904A is sequentially ordered before the test 904B within the test script.

From the test 904C in the first level there is an edge to the test 904D in the second level, since the test 904D is sequentially ordered after the test 904C within the test script. There are no edges from the 904C in the first level to the tests 904A and 904B in the second level, because the tests 904A and 904B are sequentially ordered before the test 904C within the test script. Similarly, there are no edges from the test 904D in the first level to any test 904 in the second level, because no test 904 is sequentially ordered after the test 904D within the test script (i.e., the test 904D is the last test 904 in the test script).

From the test 904B in the second level there are edges to just the tests 904C and 904D in the third level, since just the tests 904C and 904D are sequentially ordered after the test 904B within the test script. From the test 904C in the second level there is an edge to just the test 904D in the third level, since just the test 904D is sequentially ordered after the test 904C within the test script. There are no edges from the test 904D in the second level to any test 904 in the third level, because no test 904 is sequentially ordered after the test 904D within the test script.

From the test 904C in the third level there is an edge to just the test 904D in the fourth level, since just the test 904D is sequentially ordered after the test 904C within the test script. There are no edges from the test 904D in the third level to any test 904 in the fourth level, because no test 904 is sequentially ordered after the test 904D within the test script. There is no fifth level within the analysis tree 900, because the sole test 904D in the fourth level is the last test 904 within the test script.

Each chain of one or more edges traversing one or more tests 904 is a unique path within the analysis tree 900. For example, there is a unique path between the root node 902 and each test 904 in the first level; between each test 904 in the first level and every test 904 in the second level to which the test 904 is connected via an edge; and so on. These unique paths each include one edge and traverse one or two tests 904.

Other unique paths can include more than one edge and traverse more than two tests 904. For example, there is a unique path from the root node 902 to the test 904A in the first level, to the test 904B in the second level, to the test 904C in the third level, and to the test 904D in the fourth level. As another example, there is a unique path from the root node 902 to the test 904B in the second level to the test 904D in the third level. In general, a unique path starts at the root node 902 or at any test 904 within any level other than the last level of the analysis tree 900, and continues along one or more edges before ending at any other test 904 within a lower level of the tree 900.

FIG. 10 shows an example method 1000 for generating an analysis tree of the tests into which a test script has been preliminarily divided. The method 1000 can be performed to realize part 804 of the method 800 of FIG. 8. The method 1000 can be performed by a processor of a computing device. The method 1000 can be implemented as a non-transitory computer-readable data storage medium storing program code executable by this processor. The method 1000 begins by adding a root node at the top of the analysis tree (1002), and adding a child node for each test of the test script in a first level of the tree, with a connecting edge between the root node and each such child node (1004).

The method 1000 includes setting a current level of the analysis tree to the first level of the tree (1006). The method 1000 includes setting a current node to the first node of the current level of the analysis tree (1008). If the test of the current node (i.e., the test to which the current node corresponds) is not the last test of the test script (1010), then the method 1000 includes adding, in the next level of the analysis tree, a child node for each test that is ordered after the test of the current node within the test script, along with a connecting edge from the current node (1012). The method 1000 includes then advancing the current node to the next node in the current level of the analysis tree (1014), before proceeding back to part 1010.

Once the test of the current node is the last test of the test script (1010), if the current level is not the last level of the analysis tree (1016), the method 1000 includes advancing the current level to the next level of the analysis tree (1018). The method 1000 then proceeds back to part 1008. Once the test of the current node is the last test of the test script (1010), and the current level is the last level of the analysis tree (1016), the method 1000 is finished (1020).

Figure 11:
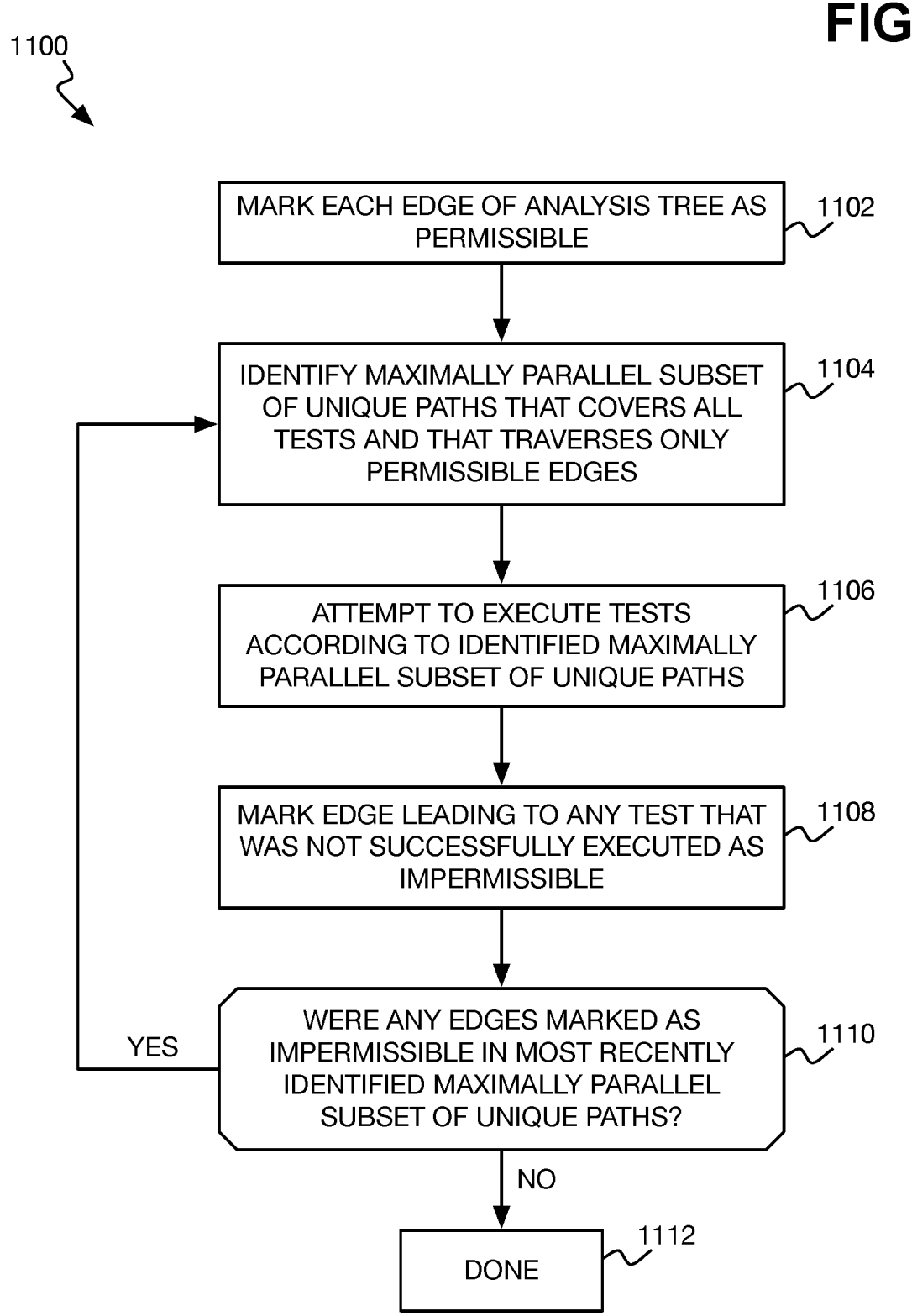
FIG. 11 is a flowchart of an example method for identifying a maximally parallel subset of unique paths within an analysis tree of tests into which a test script has been divided and that can be successfully executed in parallel.

FIG. 11 shows an example method 1100 for identifying a maximally parallel subset of unique paths through an analysis tree that cover all tests of a test script and according to which the tests can be successfully executed. The method 1100 can be performed to realize part 806 of the method 800 of FIG. 8. The method 1100 can be performed by a processor of a computing device. The method 1100 can be implemented as a non-transitory computer-readable data storage medium storing program code executable by this processor.

A subset of unique paths through an analysis tree covers all the tests of a test script if every test of the test script is traversed within the subset. The tests are executable according to a subset of unique paths in that each unique path is executed in parallel. That is, the tests of one unique path are executed in parallel with the tests of another unique path, and so on. The tests of a given unique path are executed sequentially, in their order within the test script.

The tests are successfully executable according to a subset of unique paths if the unique paths can be executed in parallel without any test of any path failing. If two tests are assigned to different unique paths and thus executed in parallel, but the execution of the first test is conditioned on the execution of the second test, then execution of the first test will fail. A subset of unique paths according to which the tests are successfully executable is the maximally parallel such subset if it includes the maximum number of unique paths of any such successfully executable subset.

The method 1100 includes initially marking each edge of the analysis tree as permissible (1102). That an edge is permissible means that the edge can be included when identifying a maximally parallel subset of unique paths. The method 1100 thus identifies the maximally subset of unique paths through the analysis tree that covers all the tests and that traverses only permissible edges of the tree (1104). Because all the edges are permissible the first time part 1104 is performed, such initial performance of part 1104 results in each test having its own unique path (viz., each unique path includes just one test) in the identified maximally parallel subset.

The method 1100 includes then attempting to execute the tests according to the identified maximally parallel subset of unique paths (1106). The unique paths of tests are executed in parallel, with tests belonging to the same unique path being executed sequentially according to their order within the test script. Execution of any given test may succeed or fail. Execution of a first test will fail if it is executed in parallel with a second test, but the first test's execution is conditioned on the execution of the second test (i.e., the first test is part of a different unique path than the second test).

The method 1100 includes marking the edge leading to any test that was not successfully executed as impermissible (1108). If any edges were marked as impermissible in the most recently identified maximally parallel subset of unique paths (1110), then the method 1100 is repeated at part 1104. In other words, if any edges were marked as impermissible, the tests cannot be successfully executed according the identified maximally parallel subset of unique paths. Therefore, the maximally parallel subset of unique paths has to again be identified so as not to traverse the impermissible edges.

In one implementation, the tests are attempted to be executed in part 1106 according to the identified maximally parallel subset of unique paths a number of times (i.e., a number of execution attempts). In this implementation, an edge leading to a test is marked as impermissible if it was not successfully executed more than a threshold number of these times or execution attempts. Such an implementation can ensure that outlier failed executions of any given test are not considered in marking its leading edge as impermissible.

Each time the maximally parallel subset of unique paths is identified at part 1104, the subset will likely be less parallel (and will be no more parallel) than before. This is because part 1104 is repeated when edges included in the identified maximally parallel subset have been marked as impermissible, such that these edges cannot be included when the maximally parallel subset of unique paths is identified again. Once no edges traversed by the most recently identified maximally parallel subset of unique paths have been marked as impermissible (1110), the method 1100 is finished. The most recently identified maximally parallel subset of unique paths is the maximally parallel such subset according to which the tests of the test script can be successfully executed.

Figure 12A:
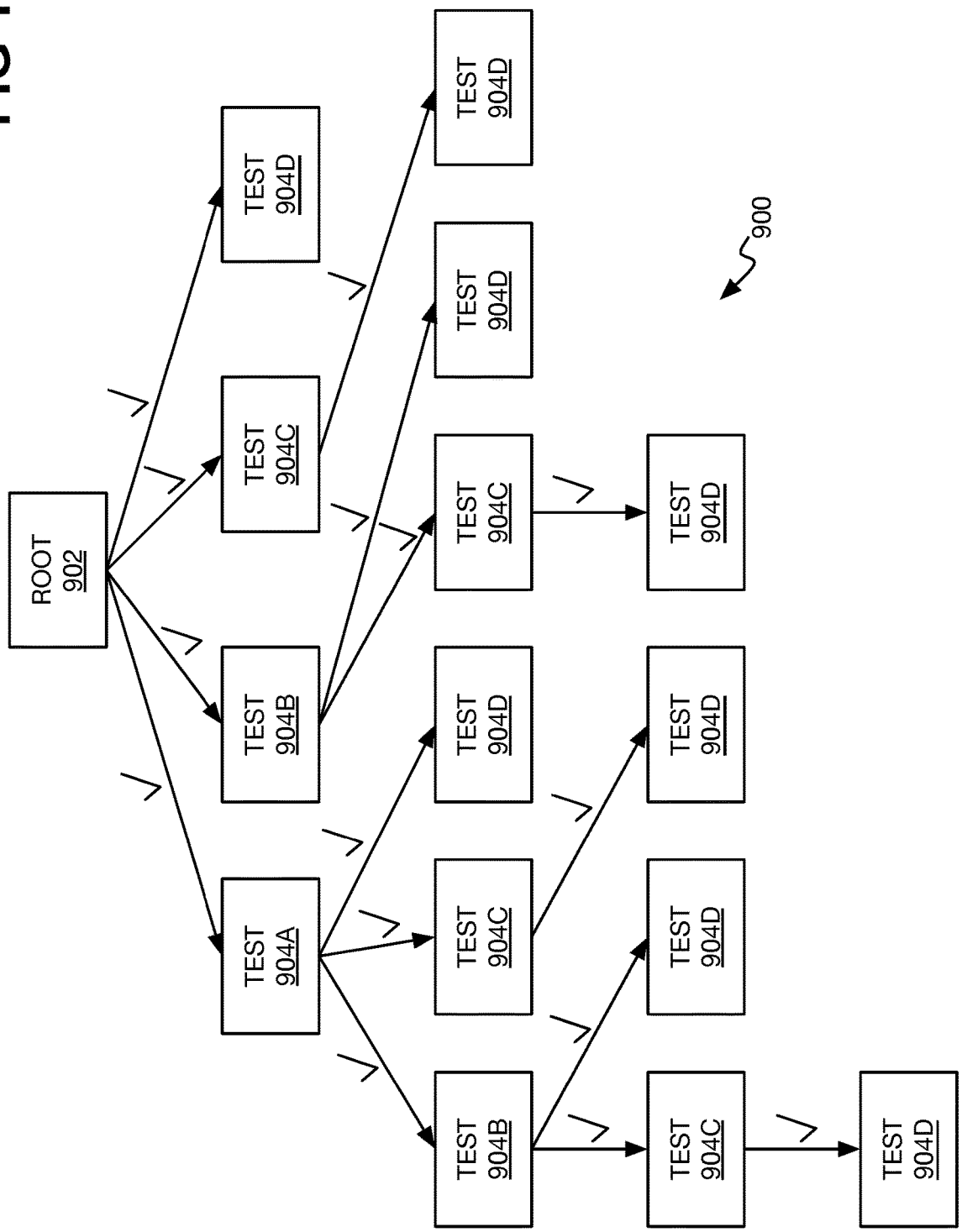
FIGS. 12A, 12B, and 12C are diagrams depicting example performance of the method of FIG. 11 to identify a maximally parallel subset of unique paths within the analysis tree of FIG. 9.
Figure 12B:
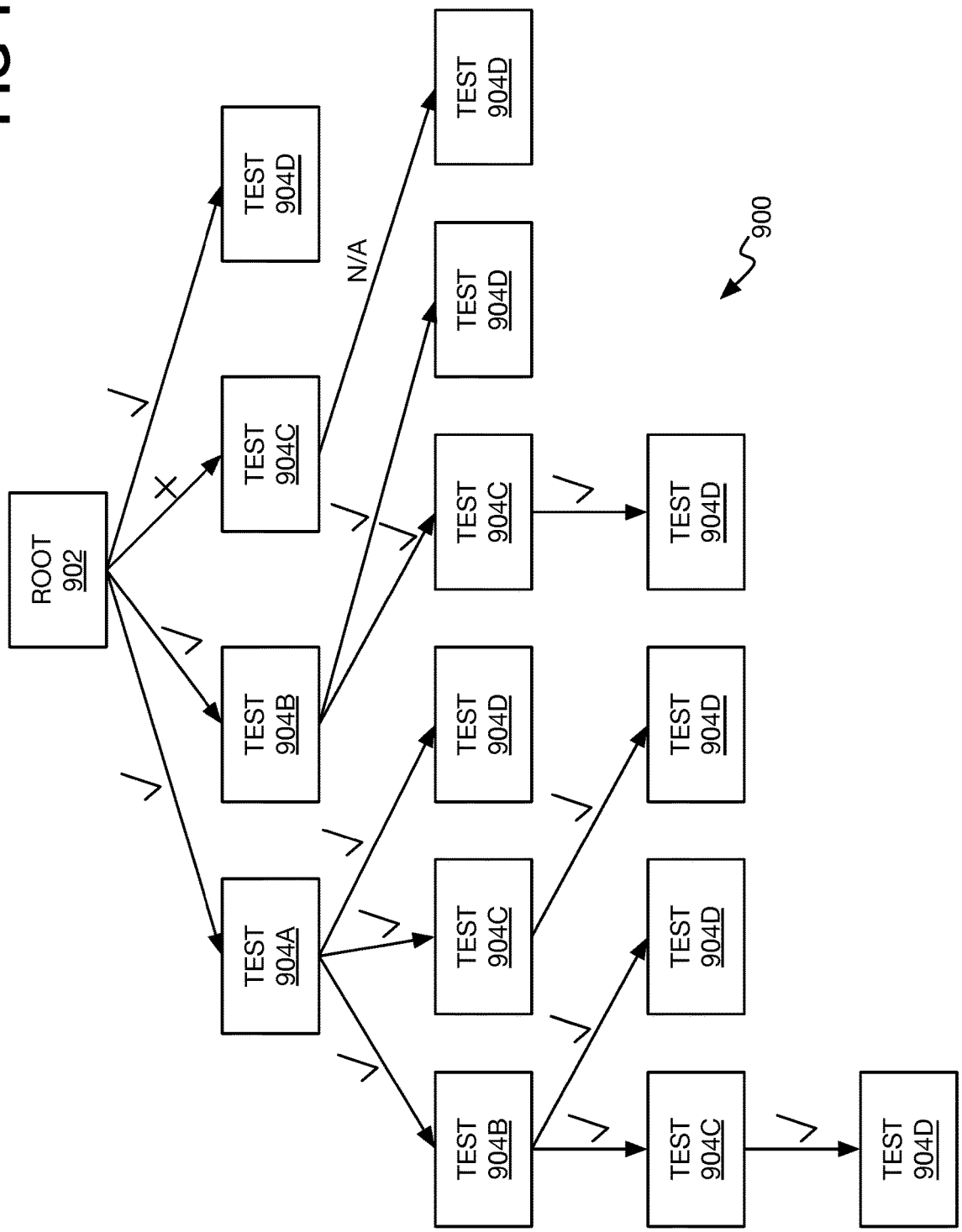
Figure 12C:
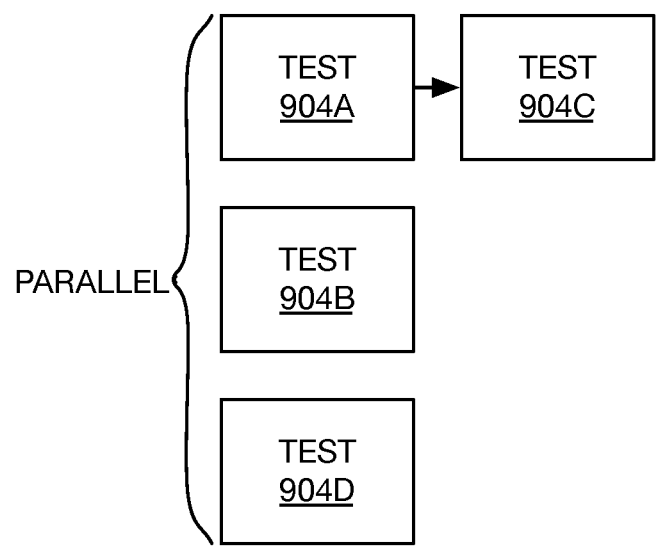

FIGS. 12A, 12B, and 12C depict example performance of the method 1100 with respect to the analysis tree of FIG. 9. In FIG. 12A, all the edges of the analysis tree have been initially marked as permissible, as indicated by checkmarks, per part 1102 of the method 1100. The maximally parallel subset of unique paths that covers all the tests is thus determined in initial performance of part 1104 as the subset of the four paths respectively leading to the nodes for the tests 904 from the root node 902, including the edges leading to these nodes from the root node 902.

Specifically, the first path of the initially identified maximally parallel subset of unique paths includes the node for the test 904A and the edge leading to this node from the root node 902. The second path of this subset includes the node for the test 904B and the edge leading to this node from the root node 902. The third path includes the node for the test 904C and the edge leading to this node from the root node 902, and the fourth path includes the node for the test 904D and the edge leading to this node from the root node 902.

Attempted execution of the tests 904 according to this identified maximally parallel subset of unique paths per part 1106 of the method 1100 may, for example purposes, result in successful execution of the tests 904A, 904B, and 904D, but unsuccessful execution of the test 904C. Therefore, in FIG. 12B, the edge leading to the test 904C from the root node 902, which is encompassed by the identified maximally parallel subset of unique paths, is marked as impermissible, as indicated by an X, per part 1008. The maximally parallel subset of unique paths is thus identified again, again per part 1104.

The newly identified maximally parallel subset of unique paths again includes paths that respectively lead to the nodes for the tests 904A, 904B, and 904C from the root node 902, including the edges leading to these nodes from the root node 902. This maximally parallel subset, though, does not include a path leading to the node for the test 904C from the root node 902, nor the edge leading to this node from the root node 902, because the edge is now impermissible. The node for the test 904C still has to be covered by the maximally parallel subset of unique paths, however.

In one alternative, the node for the test 904C may be covered by the unique path that also covers the node for the test 904A. In this case, the unique path in question includes the edge from the root node 902 to the node for the test 904A, and the edge from this latter node to the node for the test 904C. In another alternative, the node for the test 904C may instead be covered by the unique path that also covers the node for the test 904B. In this case, the unique path in question includes the edge from the root node 902 to the node for the test 904B, and the edge from this latter node to the node for the test 904C.

The two alternatives have the same degree of parallelism, and therefore either can be selected as part of the maximally parallel subset of unique paths that covers all the tests 904 and that traverses only permissible (and not impermissible) edges. For example purposes, it is assumed that the first alternative is chosen. Attempted execution of the tests 904 according to this identified maximally parallel subset of unique paths, per part 1106 of the method 1100, may result in successful execution of all the tests 904. Therefore, this identified maximally parallel subset of unique paths is deemed the maximally parallel such subset that covers all the tests 904 and according to which the tests 904 can be successfully executed.

FIG. 12C shows this maximally parallel subset of unique paths. The first unique path includes the tests 904A and 904C. The test 904C is executed after the test 904A, because the test 904C is ordered after the test 904A within the test script. The second unique path includes the test 904B, and the third unique path includes the test 904C. The three unique paths are executed in parallel. Therefore, the sequential execution of the tests 904A and 904C occurs in parallel with the execution of the test 904B, and in parallel with the execution of the test 904D.

Once the maximally parallel subset of unique paths covering all the tests and according to which the tests can be successfully executed has been identified, the unique paths of tests can be concurrently executed on testing devices. However, testing devices may be of different types. Although the tests are successfully executable according to maximally parallel subset of unique paths, different tests may not in actuality be able to be successfully executed on certain types of testing devices. Therefore, for concurrent execution of the unique paths of tests, the tests can be assigned just to testing devices of types on which they can be successfully executed.

Figure 13:
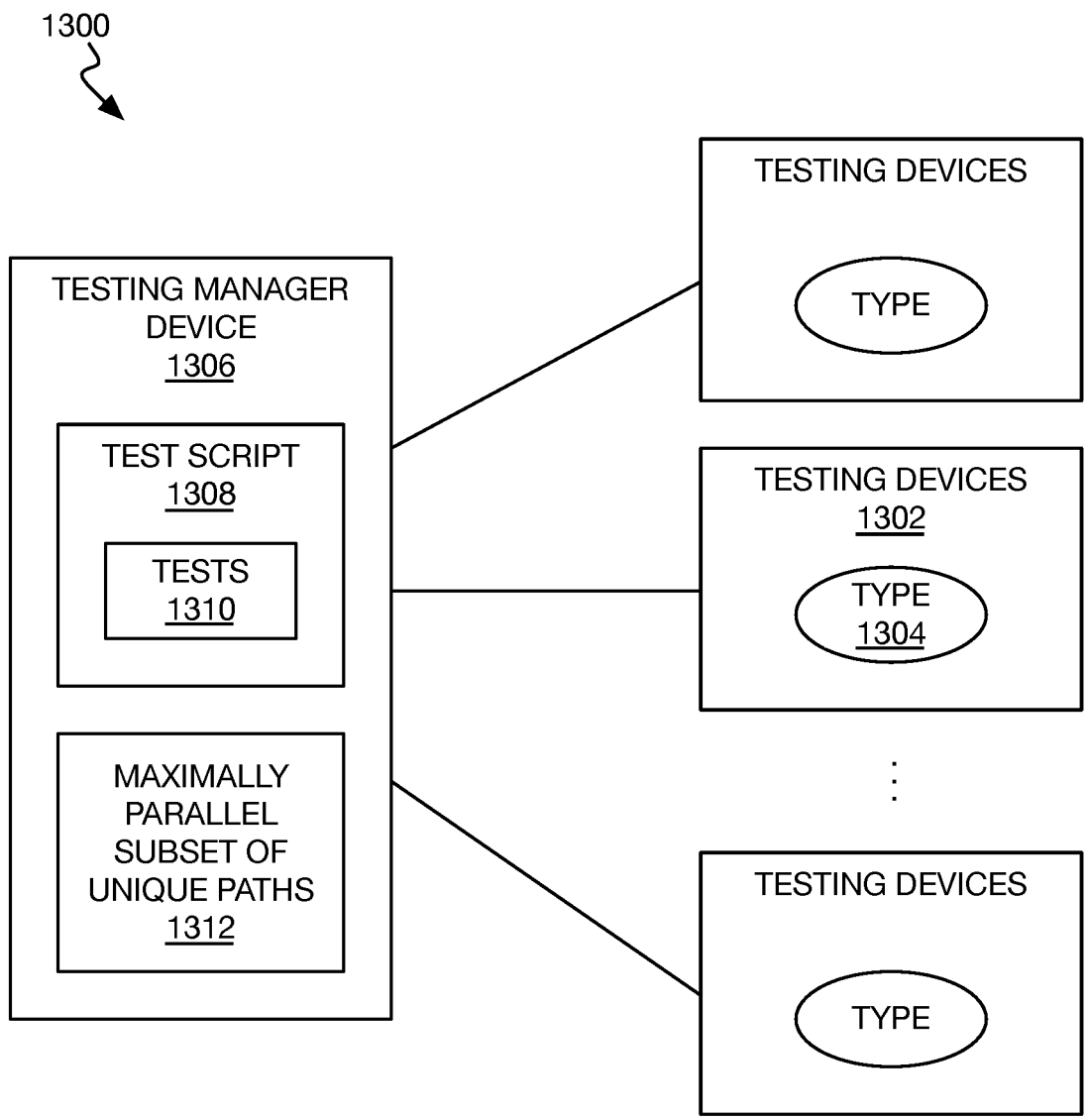
FIG. 13 is a diagram of an example system including testing devices of different types on which tests encompassed by a maximally parallel subset of unique paths can be assigned for concurrent execution of the unique paths.

FIG. 13 shows an example system 1300 in this respect. The system 1300 includes testing devices 1302 of different testing device types 1304, as well as a testing manager device 1306. The testing devices 1302 and the testing manager device 1306 may be computing devices like desktop or laptop computers, servers, or other computing devices. The testing devices 1302 may differ in their types 1304 by constituent hardware components, such as processor type and operating frequency; memory type, amount, and operating frequency; storage device type and capacity; and so on. The testing devices 1302 may additionally or alternatively differ in their types 1304 as to the software they run, such as operating system type and version.

The testing manager device 1306 can perform the methods that have been described and can execute the program code that has been described. The testing manager device 1306 stores a test script 1308 of tests 1310, as well as a maximally parallel subset of unique paths 1312 that covers all the tests 1310 and according to which the tests 1310 can be successfully executed. For each unique path of tests 1310, the testing manager device 1306 assigns the tests 1310 covered by the unique path to the testing devices 1302 of testing device types 1304 on which every test 1310 of the unique path can be successfully executed.

For example, a unique path of tests 1310 may include a first test 1310 and a second test 1310. The testing devices 1302 may include testing devices 1302 of a first type 1304 and testing devices 1302 of a second type 1304. The first test 1310 may be able to be executed successfully on testing devices 1302 of both the first and second types 1304, whereas the second test 1310 may be able to be executed successfully on testing devices 1302 of just the second type 1304. Therefore, both the first and second tests 1310 are assigned to testing devices 1302 of just the second type 1304.

The first test 1310 also has to be assigned to testing devices 1302 of just the second type 1304, even though it can be successfully executed on testing devices 1302 of the first type 1304, because execution of the second test 1310 is conditioned on execution of the first test 1310 (since the two tests 1310 are in the same unique path). The assigned testing device 1302 first performs the first test 1310, and then performs the second test 1310. Execution of the second test 1310 on a different testing device 1302 than the testing device 1302 on which the first test 1310 may not be successful, in other words, such that both tests 1310 have to be executed (and thus assigned for execution) on the same testing device 1302 of the second type 1304.

Figure 14:
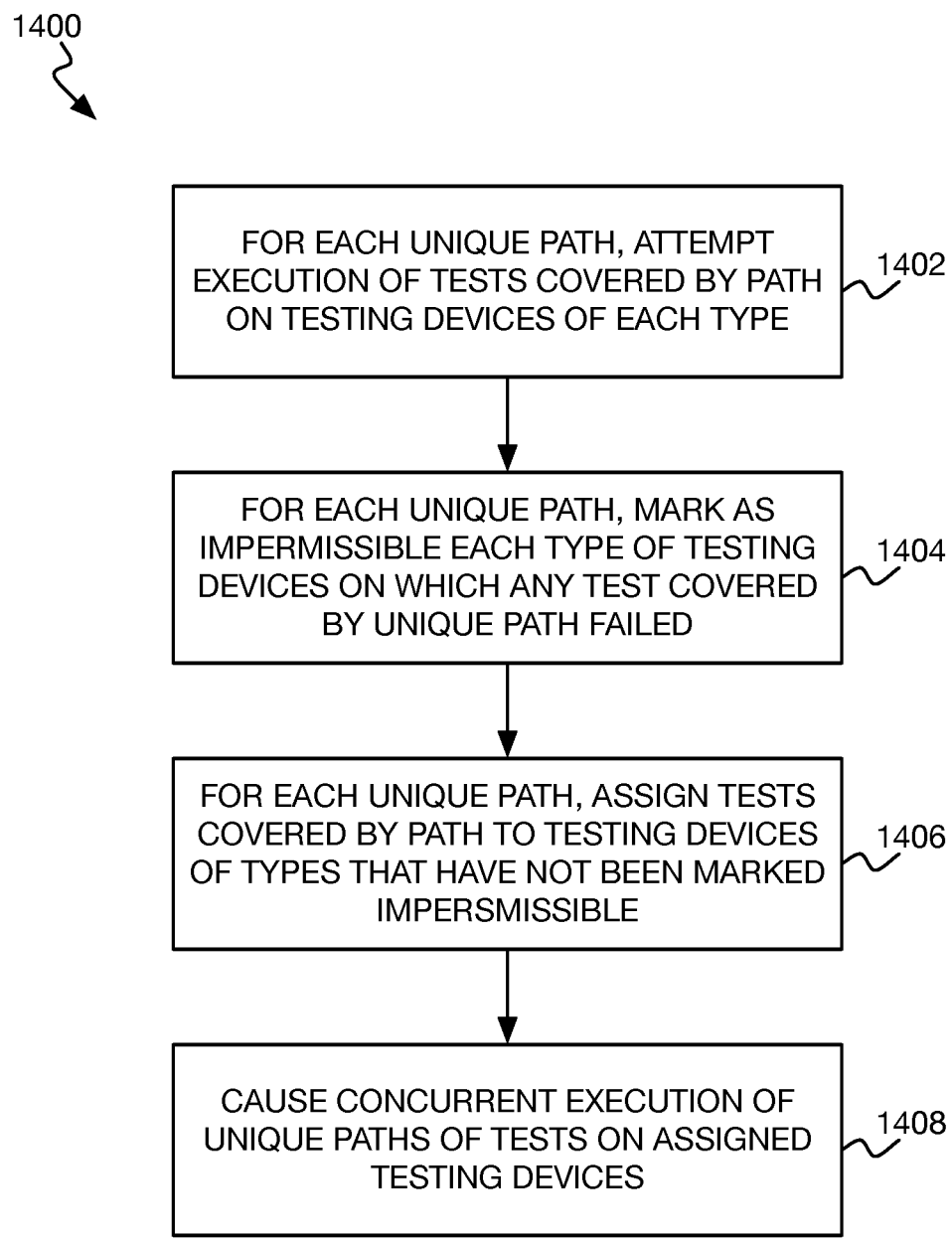
FIG. 14 is a flowchart of an example method for assigning tests encompassed by a maximally parallel subset of unique paths to testing devices of different types for concurrent execution of the unique paths.

FIG. 14 shows an example method 1400 for assigning the tests 1310 of the test script 1308 covered by a maximally parallel subset of unique paths 1312 to testing devices 1302 of different types 1304 for concurrent execution of the unique paths of tests 1310. The testing manager device 1306 can perform the method 1400. The method 1400 may be implemented as program code stored on a non-transitory computer-readable data storage medium, and executable by a processor of the testing manager device 1306.

The method 1400 includes, for each unique path of tests 1310, attempting execution of the tests 1310 covered by the path on testing devices 1302 of each type 1304 (1402). For each type 1304 of the testing devices 1302, execution of each test 1310 may be successful or unsuccessful. Therefore, for each unique path, the method 1400 marks as permissible each type 1304 of the testing devices 1302 on which any test 1310 covered by the path failed (1404).

The method 1400 includes, for each unique path of tests 1310, then assigning the tests 1310 covered by the path to testing devices 1302 of types 1304 that have not been marked as impermissible for that path (1406). That is, the tests 1310 covered by a unique path are assigned to testing devices 1302 other than those of any impermissible testing device type 1304 for the path. The method 1400 can include subsequently causing concurrent execution of the unique paths of the tests 1310 on their assigned testing devices (1408).

Techniques have been described for identifying the most efficient manner in which the test commands of a test script for an AUT can be grouped for parallel execution, to improve load testing performance of the AUT. The test commands can be preliminarily divided over tests. A maximally parallel subset of unique paths of the tests can then be identified to effectively merge tests back together as necessary. The unique paths of tests of the resultantly identified maximally parallel subset can thus be concurrently executed (viz., in parallel) to efficiently load test the AUT.

We claim:

1. A method comprising:
   dividing, by a processor, a test script into a plurality of tests, the tests having a sequential order within the test script;
   generating, by the processor, an analysis tree of the tests, each of a plurality of unique paths through the analysis tree including a subset of the tests as sequentially ordered within the test script;
   identifying, by the processor, a maximally parallel subset of the unique paths that covers all the tests and according to which the tests are successfully executable, each test appearing in only one unique path of the maximally parallel subset; and
   causing, by the processor, execution of the tests of the test scripts on a plurality of testing devices according to the maximally parallel subset of the unique paths.

2. The method of claim 1, wherein identifying the maximally parallel subset of the unique paths comprises:
   initially marking each of a plurality of edges of the analysis tree as permissible, each edge connecting a pair of the tests according to the sequential order; and
   repeatedly:
      identifying the maximally parallel subset of the unique paths that covers all the tests, the edges covered by the maximally parallel set all being permissible;
      attempting to execute the tests according to the maximally parallel subset of the unique paths; and
      marking the edge leading to any test that was not successfully executed as impermissible,
   until no edge within the maximally parallel subset of the unique paths that covers all the tests has been marked as impermissible.

3. The method of claim 2, wherein attempting to execute the tests according to the maximally parallel subset of the unique paths comprises:
   performing a plurality of execution attempts according to the maximally parallel subset of the unique paths,
   and wherein marking the edge leading to any test that was not successfully executed as impermissible comprises:
   marking the edge leading to any test that was not successfully executed in more than a threshold number of the execution attempts as impermissible.

4. The method of claim 1, wherein causing the execution of the tests of the test scripts according to the maximally parallel subset of the unique paths comprises, for each unique path of the maximally parallel subset of the unique paths:
   attempting the execution of the tests covered by the unique path on the testing devices of each of a plurality of testing device types; and
   marking, as an impermissible testing device type for the unique path, each testing device type of the testing devices on which the execution of any test covered by the unique path failed.

5. The method of claim 4, wherein causing the execution of the tests of the test scripts according to the maximally parallel subset of the unique paths further comprises:
   for each unique path of the maximally parallel subset of the unique paths, assigning the tests covered by the unique path to the testing devices other than the testing devices marked as the impermissible testing device type for the unique path; and
   concurrently causing the execution of the tests covered by each unique path of the maximally parallel subset of the unique paths on the testing devices to which the tests have been assigned.

6. The method of claim 1, wherein dividing the test script into the tests comprises:
   causing sequential execution of a plurality of ordered test commands of the test script;
   as each ordered test command is sequentially executed, monitoring a parameter; and
   dividing the ordered test commands over the tests in correspondence with changes in the parameter greater than a threshold.

7. The method of claim 6, wherein the parameter comprises a user interface parameter.

8. A non-transitory computer-readable data storage medium storing program code executable by a processor to perform processing comprising:
   causing sequential execution of a plurality of test commands of a test script, the test commands sequentially ordered within the test script;
   monitoring a parameter as the test commands are sequentially executed;
   dividing the test commands over a plurality of tests of the test script in correspondence with changes in the parameter greater than a threshold;
   generating an analysis tree of the tests, each of a plurality of unique paths through the analysis tree including a subset of the tests as sequentially ordered within the test script; and identifying a maximally parallel subset of the unique paths that covers all the tests and according to which the tests are successfully executable, each test appearing in only one unique path of the maximally parallel subset; and causing execution of the tests of the test scripts on testing devices according to the maximally parallel subset of the unique paths.

9. The non-transitory computer-readable data storage medium of claim 8, wherein dividing the ordered test commands over the tests in correspondence with the changes in the parameter greater than the threshold comprises:

defining a current test starting with a first test command of the test script;

setting a current test command to a second test command of the test script;

repeatedly:
in response to a change in the parameter from a prior test command to the current test command being greater than the threshold, completing definition of the current test as ending with the prior test command and, in response to the current test command not being a last test command of the test script, defining a new current test starting with the current test command;

in response to the current test command being the last test command of the test script, setting an exit condition; and in response to the current test command not being the last test command of the test script, advancing the current test command to a next test command of the test script, until the exit condition has been set.

10. The non-transitory computer-readable data storage medium of claim 8, wherein the tests are sequentially ordered over the test commands of the test script, a first test starts at a first test command of the test script, and every other test starts at a test command of the test script at which a change in the parameter from a prior test command of the test script is greater than the threshold.

11. The non-transitory computer-readable data storage medium of claim 8, wherein the tests do not overlap one another in encompassing the test commands, each test encompasses a different sequentially contiguous subset of the test commands, and each test command is encompassed by just one of the tests.

12. The non-transitory computer-readable data storage medium of claim 11, wherein a border between each pair of a plurality of pairs of adjacent tests corresponds to a change in the parameter from a last test command encompassed by a first test of the pair to a first test command encompassed by a second test of the pair being greater than the threshold.

13. The non-transitory computer-readable data storage medium of claim 8, wherein the parameter comprises a user interface parameter.

14. The non-transitory computer-readable data storage medium of claim 13, wherein the user interface parameter comprises one or more of:

a user interface object that is a subject of execution of a test command of the test script;

a screenshot after the execution of the test command; and a portion within the screenshot that changed during the execution of the test command.

15. The non-transitory computer-readable data storage medium of claim 8, wherein causing the execution of the tests of the test scripts according to the maximally parallel subset of the unique paths comprises:

for each unique path of the maximally parallel subset of the unique paths:

attempting execution of the tests covered by the unique path on the testing devices of each of a plurality of testing device types; and marking, as an impermissible testing device type for the unique path, each testing device type of the testing devices on which the execution of any test covered by the unique path failed;

assigning the tests covered by the unique path to the testing devices other than the testing devices of any impermissible testing device type for the unique path; and concurrently causing the execution of the tests covered by each unique path of the maximally parallel subset of the unique paths on the testing devices to which the tests have been assigned.

16. The non-transitory computer-readable data storage medium of claim 8, wherein identifying the maximally parallel subset of the unique paths comprises:

initially marking each of a plurality of edges of the analysis tree as permissible, each edge connecting a pair of the tests according to the sequential order; and repeatedly:
identifying the maximally parallel subset of the unique paths that covers all the tests, the edges covered by the maximally parallel set all being permissible;

attempting to execute the tests according to the maximally parallel subset of the unique paths; and marking the edge leading to any test that was not successfully executed as impermissible, until no edge within the maximally parallel subset of the unique paths that covers all the tests has been marked as impermissible.

17. A system comprising:

a plurality of testing devices of different testing device types;

a testing manager device to, for each unique path of a maximally parallel subset of unique paths that cover all tests into which a test script has been divided:

attempt execution of the tests covered by the unique path on the testing devices of the different testing device types;

mark, as an impermissible testing device type for the unique path, each testing device type of the testing devices on which the execution of any test covered by the unique path failed; and assign the tests covered by the unique path to the testing devices other than the testing devices of any impermissible testing device type for the unique path, wherein the testing manager device is further to concurrently cause the execution of the tests covered by each unique path of the maximally parallel subset of the unique paths on the testing devices to which the tests have been assigned.

18. The system of claim 17, wherein the testing manager device is further to:

cause sequential execution of a plurality of test commands of the test script, the test commands sequentially ordered within the test script;

monitor a parameter as the test commands are sequentially executed in order;

divide the test commands over the tests of the test script in correspondence with changes in the parameter greater than a threshold;

generate an analysis tree of the tests, each unique path being through the analysis tree and including a subset of the tests as sequentially ordered within the test script; and identify the maximally parallel subset of the unique paths as that which covers all the tests and according to which the tests are successfully executable, each test appearing in only one unique path of the maximally parallel subset.

19. The system of claim 18, wherein the testing manager device is further to identify the maximally parallel subset of the unique paths by:

initially marking each of a plurality of edges of the analysis tree as permissible, each edge connecting a pair of the tests according to the sequential order; and repeatedly:

identifying the maximally parallel subset of the unique paths that covers all the tests, the edges covered by the maximally parallel set all being permissible;

attempting to execute the tests according to the maximally parallel subset of the unique paths; and marking the edge leading to any test that was not successfully executed as impermissible, until no edge within the maximally parallel subset of the unique paths that covers all the tests has been marked as impermissible.

20. The system of claim 17, wherein the testing manager device is further to:

divide the test script into the tests, the tests having a sequential order within the test script; and generate an analysis tree of the tests, each of the unique paths being through the analysis tree and including a subset of the tests as sequentially ordered within the test script.

* * * * *